(12) United States Patent
Orji et al.

(10) Patent No.: US 9,279,898 B2
(45) Date of Patent: Mar. 8, 2016

(54) METHODS AND SYSTEMS FOR CORRECTION OF STREAMER-DEPTH BIAS IN MARINE SEISMIC SURVEYS

(75) Inventors: Okwudili Orji, Oslo (NO); Walter Söllner, Oslo (NO)

(73) Assignee: PGS GEOPHYSICAL AS, Oslo (NO)

( * ) Notice: Subject to any disclaimer, the term of this patent is extended or adjusted under 35 U.S.C. 154(b) by 1065 days.

(21) Appl. No.: 13/369,895

(22) Filed: Feb. 9, 2012

(65) Prior Publication Data
US 2013/0208565 A1 Aug. 15, 2013

(51) Int. Cl.
*G01V 1/38* (2006.01)
*G01V 1/36* (2006.01)

(52) U.S. Cl.
CPC .............. *G01V 1/362* (2013.01); *G01V 1/3835* (2013.01); *G01V 2210/56* (2013.01)

(58) Field of Classification Search
CPC .. G01V 1/362; G01V 1/3835; G01V 2210/56
See application file for complete search history.

(56) References Cited

U.S. PATENT DOCUMENTS

| | | | |
|---|---|---|---|
| 7,872,942 B2 * | 1/2011 | Sollner | G01V 1/38 367/21 |
| 2006/0209634 A1 | 9/2006 | Vigen | |
| 2008/0253227 A1 | 10/2008 | Sollner | |

FOREIGN PATENT DOCUMENTS

EP 2177993 A2 4/2010

OTHER PUBLICATIONS

Extended European Search Report mailed Nov. 17, 2014, in the prosecution of patent application No. 13154694.7, 5 pages.
Orji Okwudili et al., "Imaging the sea surface using a dual-sensor towed streamer", Geophysics, Nov.-Dec. 2010, vol. 75, No. 6, pp. V111-V118.

* cited by examiner

*Primary Examiner* — Krystine Breier

(57) ABSTRACT

Computational systems and methods to be carried out by the computational systems for determining streamer-depth bias during exploration-seismology experiments are disclosed. An exploration-seismology vessel tows a number of streamers that form a smoothly varying data acquisition surface located beneath a fluid surface. In one aspect of this disclosure, the method determines a set of image points that represent a profile of the fluid surface above each streamer. The image points are determined based on pressure and velocity wavefields measured at dual sensors of the streamer. The method then determines an elevation parameter of the image points that minimizes DC offset in a spectral domain of the image points. The elevation parameter corresponds to the streamer-depth bias and can be used to correct for the streamer-depth bias in subsequent calculations of a fluid-surface profile.

20 Claims, 17 Drawing Sheets

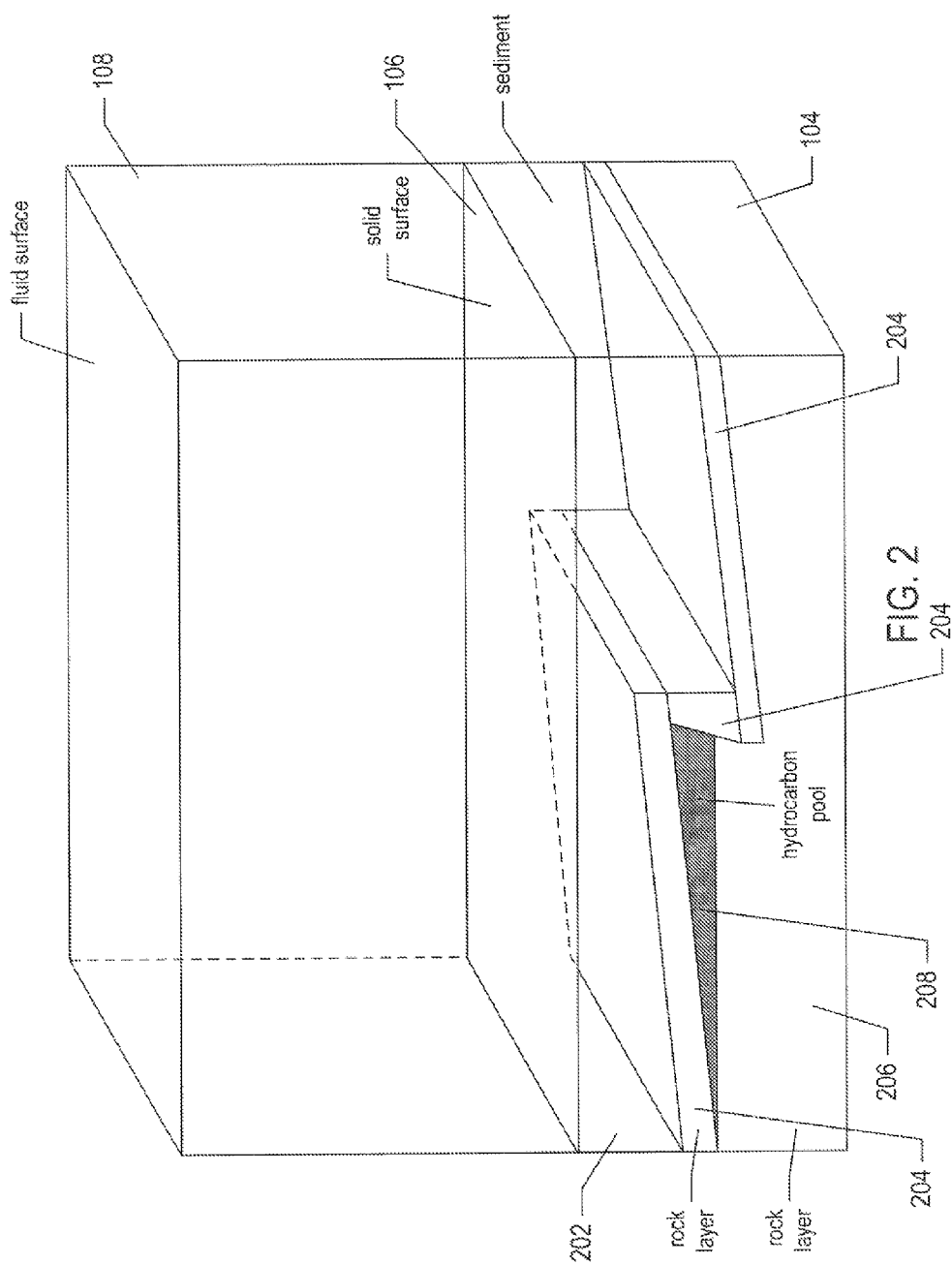

METHODS AND SYSTEMS FOR CORRECTION OF STREAMER-DEPTH BIAS IN MARINE SEISMIC SURVEYS

BACKGROUND

In the past few decades, the petroleum industry has invested heavily in the development of marine seismic survey techniques that yield knowledge of subterranean formations beneath a body of water in order to find and extract valuable mineral resources, such as oil and natural gas. High-resolution seismic images of a subterranean formation are essential for quantitative seismic interpretation and improved reservoir monitoring. For a typical marine seismic survey, an exploration-seismology vessel tows a seismic source and one or more streamers just below the surface of the water over a subterranean formation to be investigated for mineral deposits. The vessel contains seismic acquisition equipment, such as navigation control, seismic source control, seismic sensor control, and recording equipment. The seismic source control causes the seismic source, which is typically an air gun, to produce an acoustic impulse at selected times. The impulse sound waves travel down through the water and into the subterranean formation. At each interface between different types of rock, a portion of the sound wave is reflected back toward the surface and into the body of water. The streamers towed behind the vessel are elongated cable-like structures. Each streamer includes a number of sensors that detect pressure and velocity changes in the water created by the sound waves reflected back into the water from the subterranean formation and by the sound waves reflected off of the water surface. The pressure and velocity changes associated with sound waves reflected off of the water surface are referred to as a "surface reflection" that creates a "ghost" signal in seismic signals recorded by the recording equipment. The ghost signal is manifest as spectral notches in the recorded signals that make it difficult to obtain accurate high-resolution seismic images of the subterranean formation.

The ghost signal is influenced by the water surface topography and reflection coefficients. As a result, a number of techniques have been developed to characterize the time-varying water surface topography in an effort to de-ghost recorded signals. However, when water surface images and reflection coefficients do not properly characterize the water surface, the seismic images of subterranean formations produced from de-ghosted signals are still generally inaccurate. In particular, water surface images obtained without taking into account an accurate estimate if the streamer depth can result in an inaccurate vertical position of water surface images, which contributes to inaccuracy of images of the subterranean formation. As a result, those working in the petroleum industry continue to seek systems and methods to more accurately determine the streamer depth.

DESCRIPTION OF THE DRAWINGS

FIG. 2 shows subsurface features of a subterranean formation in the lower portion of the domain volume shown in FIG. 1.

DETAILED DESCRIPTION

This disclosure is directed to computational methods and systems for correcting streamer-depth bias in the data collected by streamer sensors. Accurate streamer-depth estimates are in turn used to calculate an accurate estimation of a fluid-surface elevation. In particular, an exploration-seismology vessel tows a number of streamers that form a smoothly varying data acquisition surface located beneath a fluid surface. The streamers include sensors that measure pressure and/or velocity wavefields, which are digitally encoded and stored. The method computationally determines and stores a digitally encoded set of image points that represents a profile of the fluid surface above each streamer, based on the digitally encoded, stored-data representations of the pressure and velocity wavefields. The image points are then transformed to a spectral domain in which the method calculates and stores an elevation parameter that minimizes a DC offset in the spectral domain. The elevation parameter corresponds to the streamer-depth bias and can be used to correct for the streamer-depth bias in subsequent fluid-surface-profile calculations.

The following discussion includes two subsections: (1) an overview of exploration seismology and an example of streamer-depth bias; and (2) a method to correct for streamer-depth bias as an example of computational methods and systems to which the current description is directed. Reading of the first subsection can be omitted by those already familiar with exploration marine seismology and streamer-depth bias.

An Overview of Exploration Seismology and an Example of Streamer-Depth Bias

Figure 1:
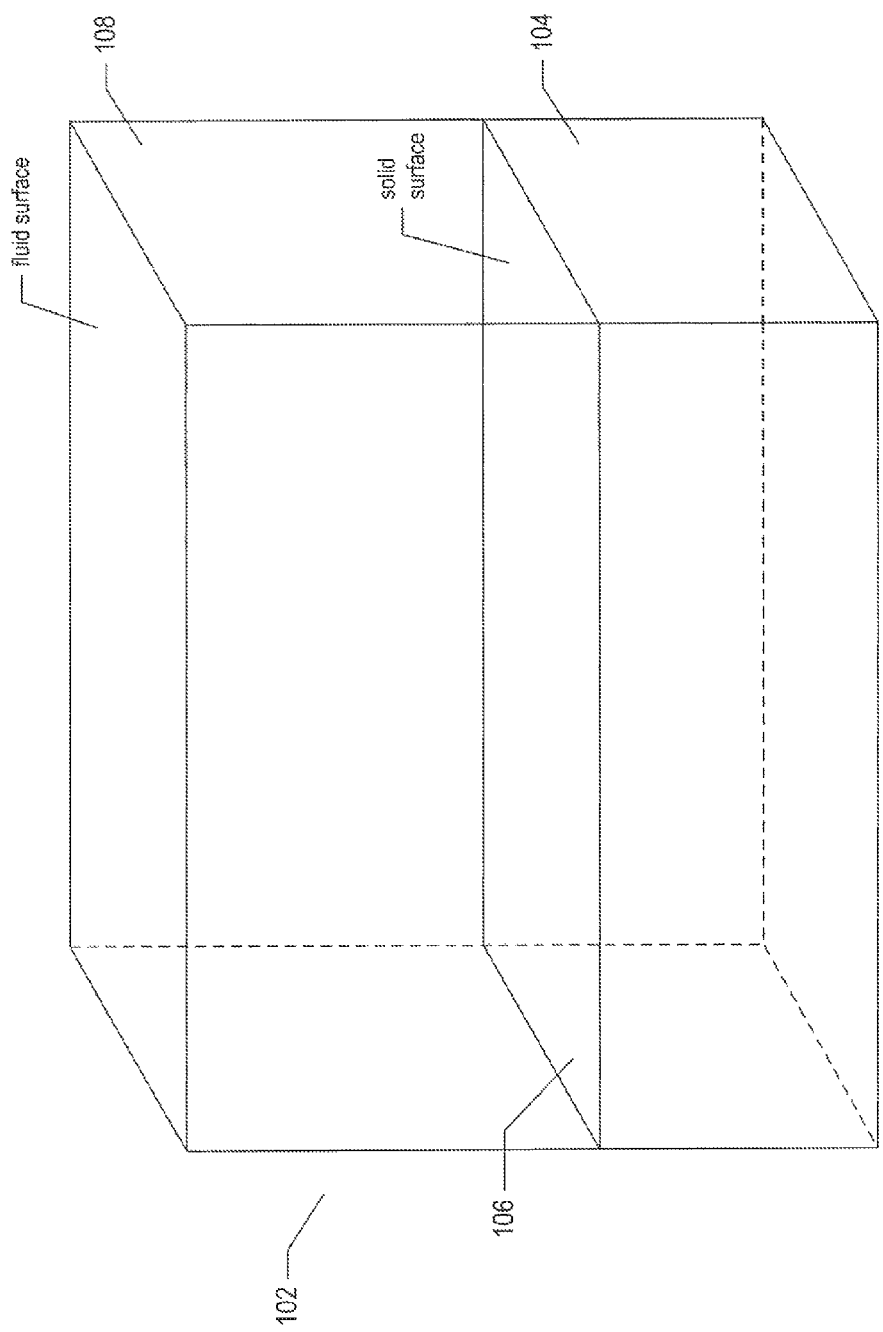
FIG. 1 shows a domain volume of the earth's surface.

FIG. 1 shows a domain volume of the earth's surface. The domain volume 102 comprises a solid volume of sediment and rock 104 below the solid surface 106 of the earth that, in turn, underlies a fluid volume of water 108 within an ocean, an inlet or bay, or a large freshwater lake. The domain volume shown in FIG. 1 represents an example experimental domain for a class of exploration-seismology observational and analytical techniques and systems referred to as "marine exploration seismology."

FIG. 2 shows subsurface features of a subterranean formation in the lower portion of the domain volume shown in FIG.

1. As shown in FIG. 2, for exploration-seismology purposes, the fluid volume 108 is a relatively featureless, generally homogeneous volume overlying the solid volume 104 of interest. However, while the fluid volume can be explored, analyzed, and characterized with relative precision using many different types of methods and probes, including remote-sensing submersibles, sonar, and other such devices and methods, the volume of solid crust 104 underlying the fluid volume is comparatively far more difficult to probe and characterize. Unlike the overlying fluid volume, the solid volume is significantly heterogeneous and anisotropic, and includes many different types of features and materials of interest to exploration seismologists. For example, as shown in FIG. 2, the solid volume 104 may include a first sediment layer 202, a first fractured and uplifted rock layer 204, and a second, underlying rock layer 206 below the first rock layer. In certain cases, the second rock layer 206 may be porous and contain a significant concentration of liquid hydrocarbon 208 that is less dense than the second-rock-layer material and that therefore rises upward within the second rock layer. In the case shown in FIG. 2, the first rock layer is not porous, and therefore forms a lid that prevents further upward migration of the liquid hydrocarbon, which therefore pools in a hydrocarbon-saturated layer 208 below the first rock layer 204. One goal of exploration seismology is to identify the locations of hydrocarbon-saturated porous strata within volumes of the earth's crust underlying the solid surface of the earth.

Figure 3A:
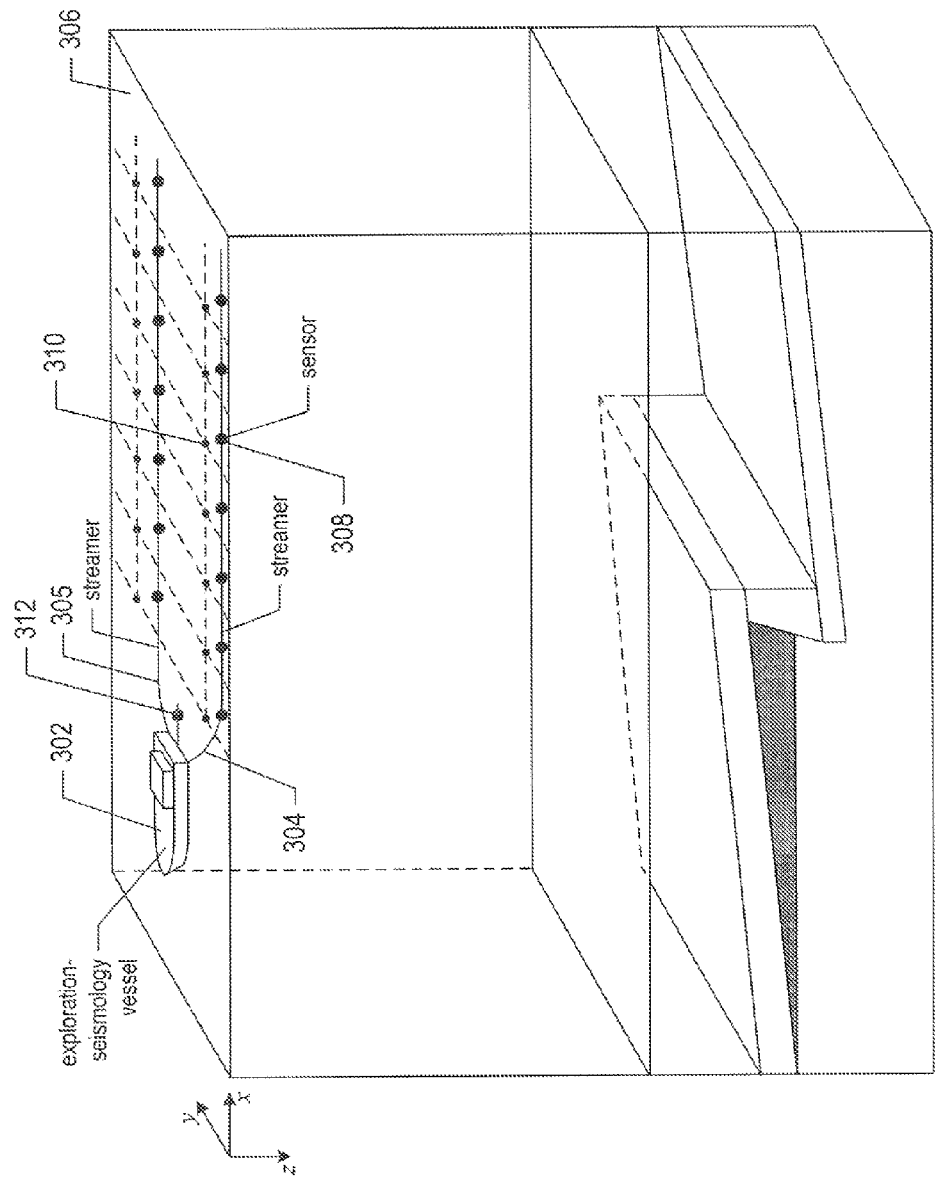
FIGS. 3A-3C show an exploration-seismology method by which digitally encoded data is instrumentally acquired for subsequent exploration-seismology processing and analysis in order to characterize the structures and distributions of features and materials underlying the solid surface of the earth.
Figure 3B:
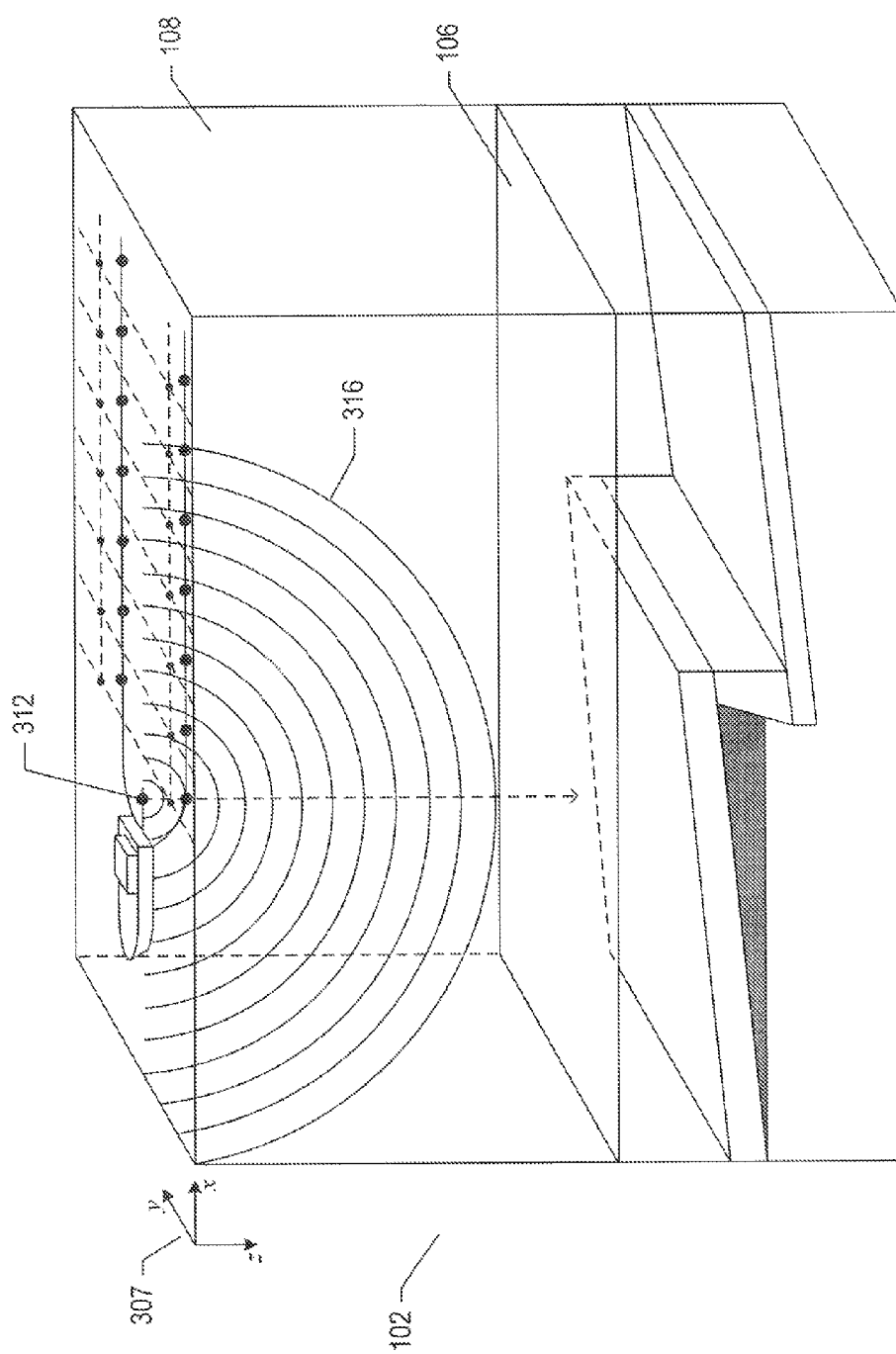
Figure 3C:
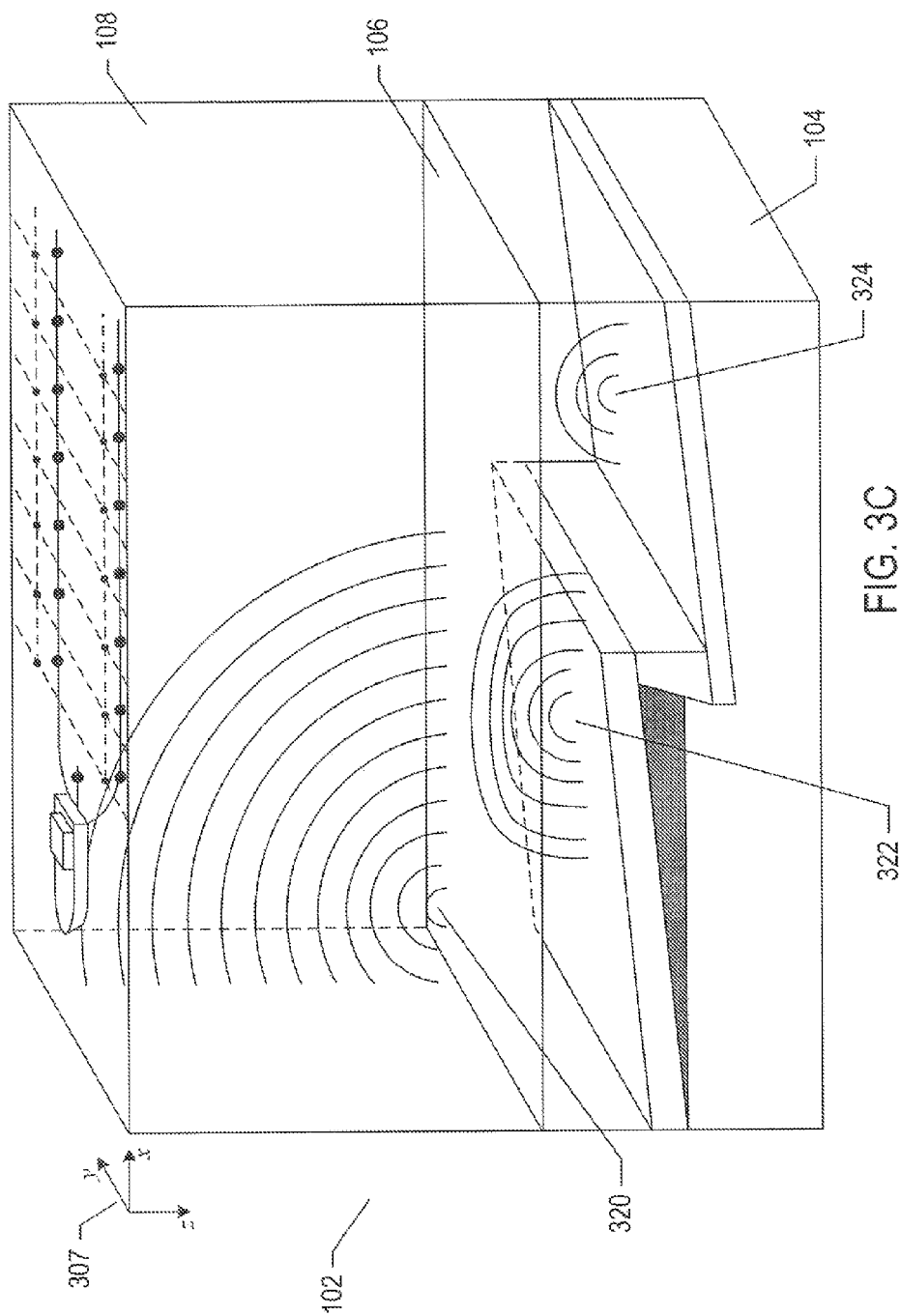

FIGS. 3A-3C show an exploration-seismology method by which digitally encoded data is instrumentally acquired for subsequent exploration-seismology processing and analysis in order to characterize the structures and distributions of features and materials of a subterranean formation. FIG. 3A shows an example of an exploration-seismology vessel 302 equipped to carry out a continuous series of exploration-seismology experiments and data collections. In particular, the vessel 302 tows one or more streamers 304-305 across an approximately constant-depth plane generally located a number of meters below the fluid surface 306. The streamers 304-305 are long cables containing power and data-transmission lines to which sensors, such as the sensor represented by the shaded disk 308 in FIG. 3A, are connected at regular intervals. In one type of exploration seismology, each sensor, such as sensor 308 in FIG. 3A, comprises a pair of seismic sensors including a geophone, which detects vertical displacement within the fluid medium over time by detecting particle velocities or accelerations, and a hydrophone, which detects variations in pressure over time. The streamers 304-305 and the vessel 302 include sophisticated sensing electronics and data-processing facilities that allow sensor readings to be correlated with absolute positions on the fluid surface and absolute three-dimensional positions with respect to an arbitrary three-dimensional coordinate system. FIG. 3A and subsequent figures include a Cartesian coordinate system 307 in order to specify position and orientation within the fluid volume 108. Note, in particular, that by convention the positive z-direction points downward away from the fluid surface 306. In FIG. 3A, the sensors along the streamers are shown to lie below the fluid surface 306, with the sensor positions correlated with overlying surface positions, such as a surface position 310 correlated with the position of sensor 308. The vessel 302 also tows one or more acoustic-wave sources 312 that produce pressure impulses at regular spatial and temporal intervals as the vessel 302 and towed streamers 304-305 move forward across the fluid surface 306.

FIG. 3B shows an expanding, spherical acoustic wavefront, represented by semicircles of increasing radius centered at the acoustic source 312, such as semicircle 316, following an acoustic pulse emitted by the acoustic source 312. The wave fronts are, in effect, shown in vertical xz-plane cross section in FIG. 3B. As shown in FIG. 3C, the outward and downward expanding acoustic wavefield, shown in FIG. 3B, eventually reaches the solid surface 106, at which point the outward and downward expanding acoustic waves partially reflect from the solid surface and partially refract downward into the solid volume, becoming elastic waves within the solid volume. In other words, in the fluid volume, the waves are compressional pressure waves, or P-waves, propagation of which can be modeled by the acoustic-wave equation while, in a solid volume, the waves include both P-waves and transverse waves, or S-waves, the propagation of which can be modeled by the elastic-wave equation. Within the solid volume, at each interface between different types of materials or at discontinuities in density or in one or more of various other physical characteristics or parameters, downward propagating waves are partially reflected and partially refracted, as at solid surface 106. As a result, each point of the solid surface and within the underlying solid volume 104 becomes a potential secondary point source from which acoustic and elastic waves, respectively, may emanate upward toward sensors in response to the pressure impulse emitted by the acoustic source 312 and downward-propagating elastic waves generated from the pressure impulse.

As shown in FIG. 3C, secondary waves of significant amplitude are generally emitted from points on or close to the solid surface 106, such as point 320, and from points on or very close to a discontinuity in the solid volume, such as points 322 and 324. Tertiary waves may be emitted from the fluid surface back towards the solid surface in response to secondary waves emitted from the solid surface and subsurface features. In many exploration-seismology analyses, the complicated wavefield formed by the superpositions of all of the secondary, tertiary, and higher-order waves emitted in response to the initial acoustic wave, both in the fluid medium and the solid medium, are modeled as acoustic waves as an often reasonable approximation to the more accurate, but far more mathematically and computationally complicated acoustic-wave-and-elastic-wave superposition model.

FIG. 3C also shows the fact that secondary waves are generally emitted at different times within a range of times following the initial pressure impulse. A point on the solid surface, such as point 320, receives a pressure disturbance corresponding to the initial pressure impulse more quickly than a point within the solid volume, such as points 322 and 324. Similarly, a point on the solid surface directly underlying the acoustic source receives the pressure impulse sooner than a more distant-lying point on the solid surface. Thus, the times at which secondary and higher-order waves are emitted from various points within the solid volume are related to the distance, in three-dimensional space, of the points from the acoustic source.

Acoustic and elastic waves, however, travel at different velocities within different materials as well as within the same material under different pressures. Therefore, the travel times of the initial pressure impulse and secondary waves emitted in response to the initial pressure impulse are complex functions of distance from the acoustic source as well as the materials and physical characteristics of the materials through which the acoustic wave corresponding to the initial pressure impulse travels. In addition, as shown in FIG. 3C for the secondary wave emitted from point 322, the shapes of the expanding wavefronts may be altered as the wavefronts cross interfaces and as the velocity of sound varies in the media traversed by the wave. The superposition of waves emitted from within the domain volume 102 in response to the initial pressure impulse is a generally very complicated wavefield that includes information about the shapes, sizes, and material characteristics of the domain volume 102, including information about the shapes, sizes, and locations of the various reflecting features within the subterranean formation of interest to exploration seismologists.

Figure 4A:
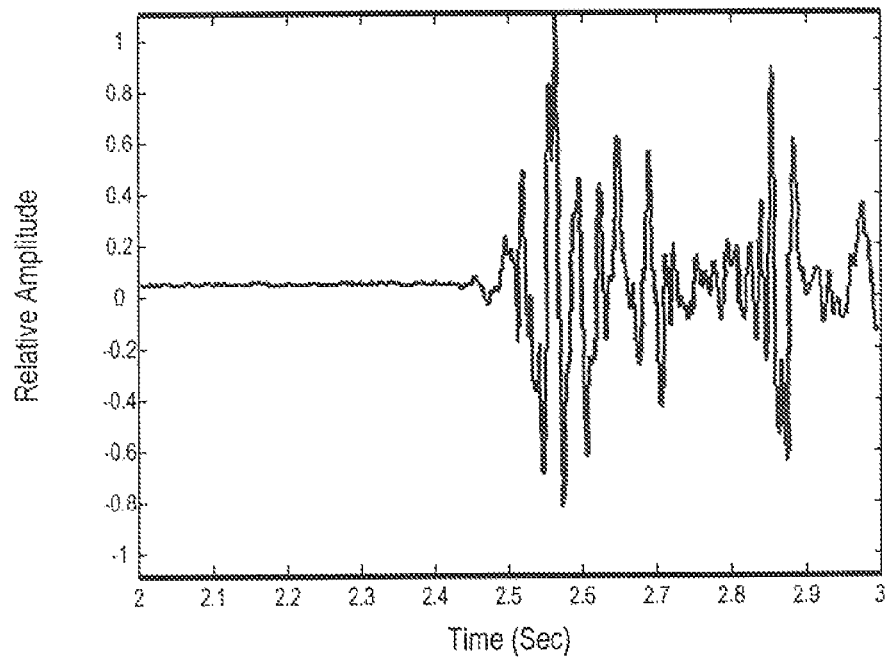
FIGS. 4A-4B show waveforms generated from hydrophone and geophone outputs.
Figure 4B:
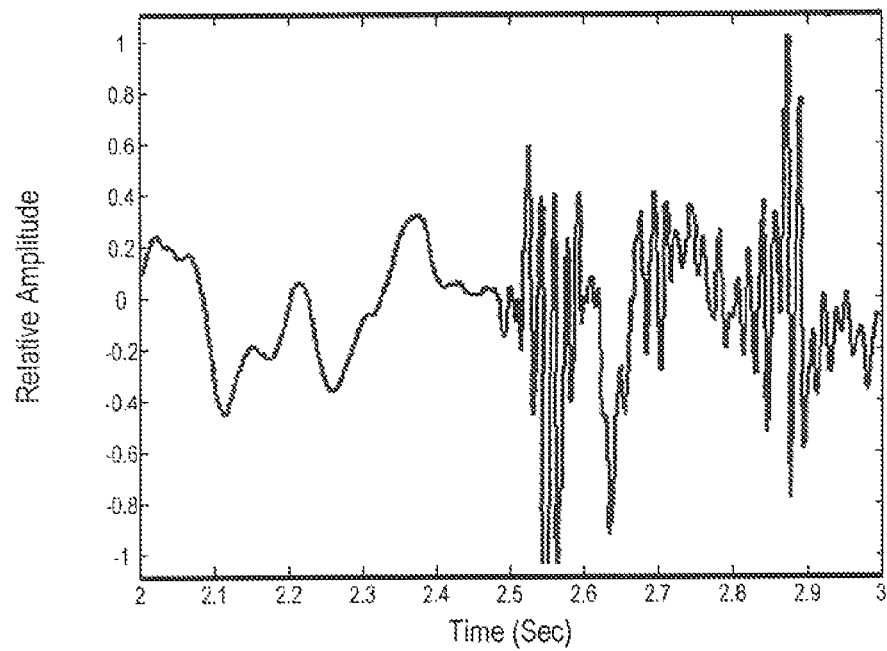

The complicated wavefield that ensues in response to the initial pressure impulse is sampled, over time, by the sensors positioned along the streamers towed by an exploration-seismology vessel. FIGS. 4A-4B show processed waveforms generated from hydrophone and geophone outputs, respectively. As shown in FIG. 4A, the waveform recorded by the hydrophone represents the pressure at times following the initial pressure impulse, with the amplitude of the waveform at a point in time related to the pressure at the hydrophone at the point in time. Similarly, as shown in FIG. 4B, the geophone provides an indication of the fluid velocity or acceleration, in a vertical direction, with respect to time.

The pressure and velocity wavefields also include fluid surface reflections that when not properly accounted for, can create ghost signals in the recorded waveforms. The ghost signals can lead to inaccurate seismic images of the subterranean formation located beneath the fluid volume. Many of the techniques to eliminate ghost signals and provide an accurate seismic image of a subterranean formation depend on having an accurate estimate of the fluid-surface. This disclosure is directed to computational systems and methods that can be used to correct inaccurate estimations of the fluid-surface elevation. In particular, this disclosure is directed to correcting inaccuracies in the estimated streamer depth, which, in turn, is used to calculate an accurate estimate of the fluid-surface elevation. A number of environmental factors contribute to inaccurate estimates of the streamer depth. For example, large surface waves often cause the streamer depth to fluctuate and changes in the local atmospheric pressure can lead to an inaccurate estimate of the streamer depth. These and other factors can introduce a slowly varying bias in the estimated depth of a streamer which is difficult to account for in calculating an accurate estimate of the fluid-surface elevation.

Figure 5A:
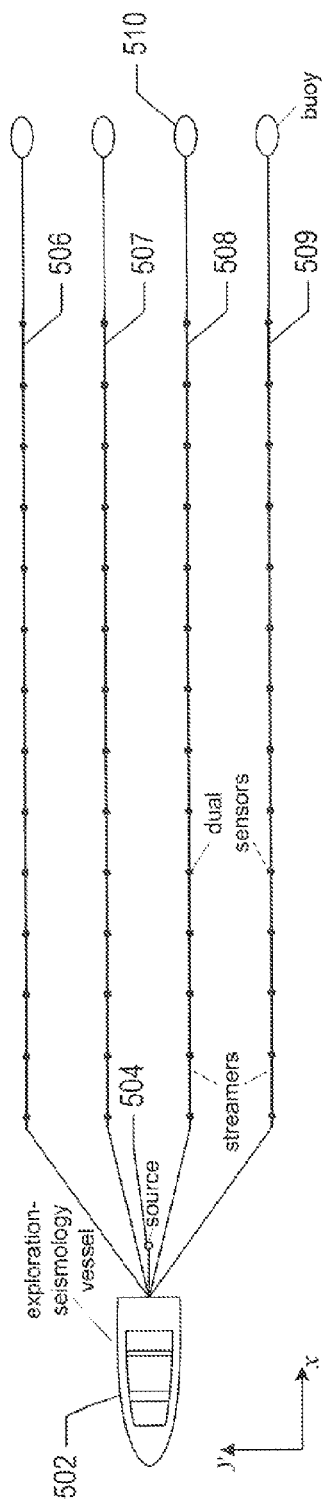
FIG. 5A shows a top view of an example exploration-seismology vessel towing a source and four streamers.
Figure 5B:
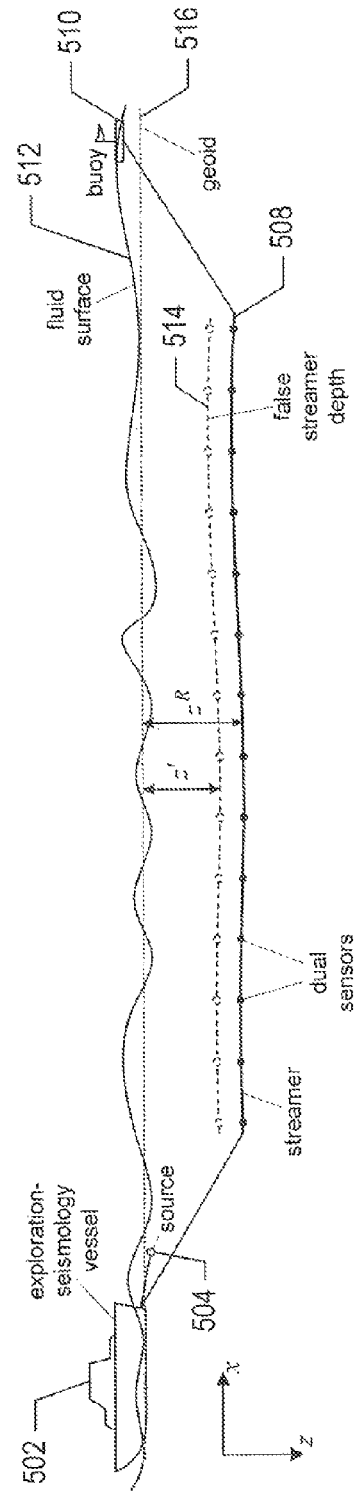
FIG. 5B shows a side view of one of the streamers shown in FIG. 5A.

FIG. 5A shows a top or xy-plane view of an example exploration-seismology vessel 502 towing a source 504 and four separate streamers 506-509 located beneath a fluid surface. Each streamer is attached at one end to the vessel 502 and at the opposite end to a buoy, such as buoy 510 attached to steamer 508. The streamers 506-509 ideally form a planar horizontal acquisition surface located beneath the fluid surface. However, in practice, the acquisition surface is smoothly varying in the z-direction due to active sea currents and weather conditions. In other words, the towed streamers may also undulate as a result of dynamic conditions of the fluid. Note that the time variation in a streamer is much smaller than the time variation associated with surface waves. FIG. 5B shows a side or xz-plane view of one of the streamers 508 located beneath the fluid surface 512. FIG. 5B represents a snapshot, at an instant in time, of the undulating fluid surface 512 and corresponding smooth wave-like shape in the streamer 508. The depth, $z^R$, of the acquisition surface can be estimated from hydrostatic pressure measurements made by depth controllers (not shown) attached to the streamers. The depth controllers are typically placed at about 300 meter intervals along each streamer and streamer depth values for intermediate sensor locations are interpolated. The depth $z^R$ and the elevation of the fluid-surface profile are estimated with respect to the geoid, which is represented in FIG. 5B by dotted line 516. The geoid is the hypothetical surface of the earth that coincides everywhere with mean sea level and is used to define zero elevation.

In the example of FIG. 5B, dashed curve 514 represents an inaccurately estimated depth for the streamer 508 because of environmental factors that introduce streamer-depth bias into the estimated depth of the streamer 508. The incorrectly estimated streamer depth z' can lead to an inaccurate estimation of the fluid-surface elevation. The following description is directed to methods and computational systems to correct the streamer-depth bias and determine an accurate estimate of the elevation of the fluid surface with respect to the geoid.

A Method to Correct for Streamer-Depth Bias as an Example of Computational Processing Methods and Systems FIGS. 6A-6D illustrate aspects of an example of a computational processing method directed to correcting streamer-depth bias in forming a fluid-surface profile that represents the fluid-surface topography and reflection coefficients with respect to each streamer of a number of streamers towed by an exploration-seismology vessel. In the following description, streamer-depth bias is corrected as part of a calculation to determine a fluid-surface profile. Note that, although an example of a method for correcting streamer-depth is described with reference to a particular method of estimating the fluid-surface profile, the disclosed methods for correcting streamer-depth are not intended to be limited to this particular method for forming the fluid-surface profile, but instead can be used with many different methods used to determine the fluid-surface profile. In other words, the methods described below are not intended to be limited to streamer-wise processing of a three-dimensional data set. Streamer-wise processing of a three-dimensional data can only be used for a three-dimensional data set that is sparsely sampled in an inline direction.

Figure 6A:
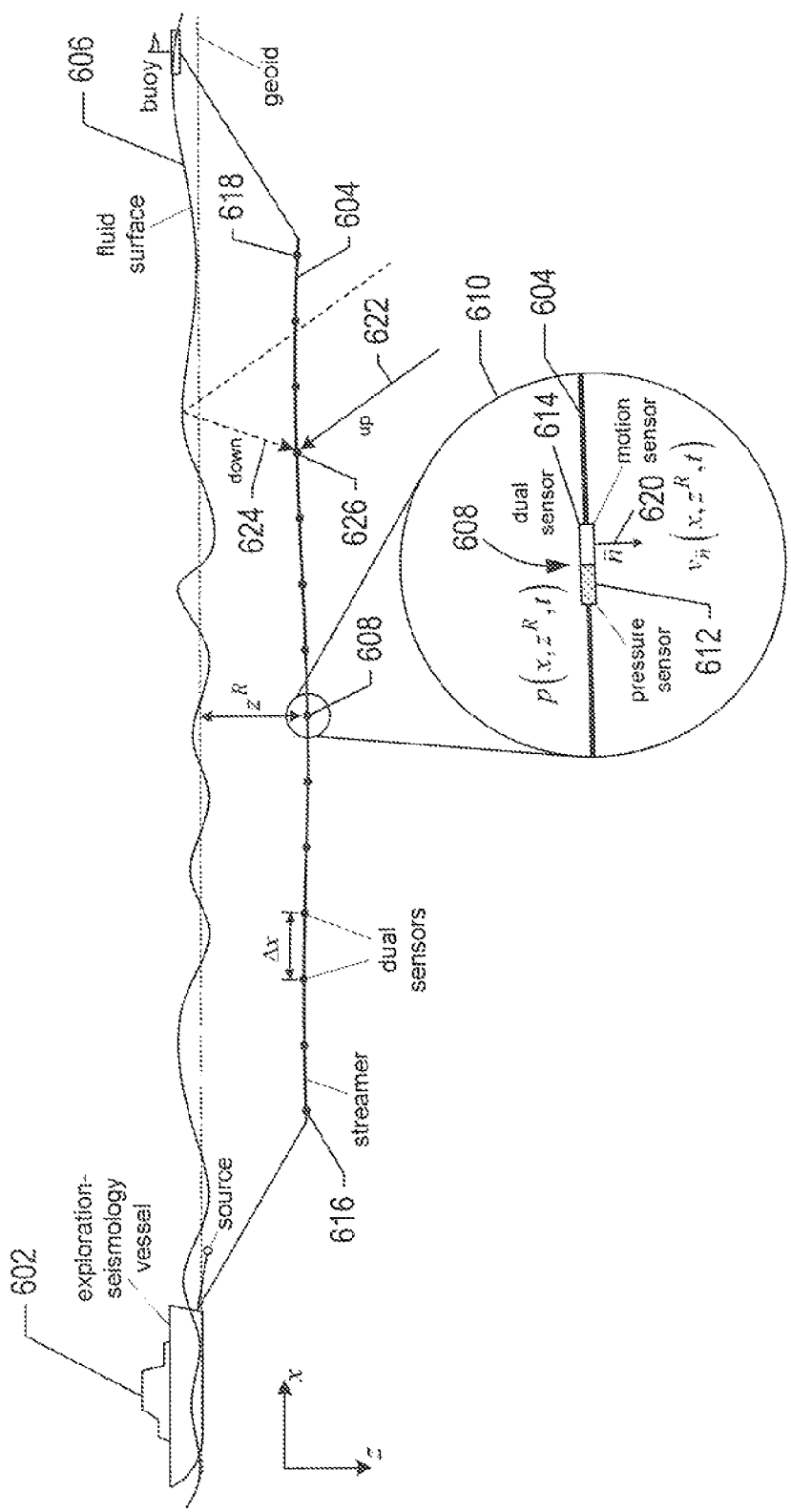
FIGS. 6A-6D show aspects of a processing method directed to correcting streamer-depth bias.

FIG. 6A shows a side or xz-plane view of an exploration-seismology vessel 602 and one streamer 604 of a number of streamers towed by the vessel that form a smoothly varying data acquisition surface located beneath a fluid surface 606. The streamers include depth controllers that measure hydrostatic pressure. These measurements are used to estimate streamer depths $z^R$ along the streamer with respect to the geoid. The estimated streamer depths are then used to calculate an interpolated streamer configuration that approximates the wave-like configuration of the actual streamer at an instant in time. As shown in FIG. 6A, the streamer 604 includes a number of receivers or dual sensors represented by shaded disks, such as shaded disk 608, that are spaced at regular intervals, Δr, along the streamer 604. A magnified view 610 of the dual sensor 608 reveals that the dual sensor includes a pressure sensor 612, such as a hydrophone, and a motion sensor 614, such as a geophone. Each of the pressure sensors located along the streamer 408 measures a pressure wavefield denoted by p(x, y, $z^R$, t) and each of the motion sensors located along the streamer 604 measures a velocity wavefield denoted by $v_{\vec{n}}$(x, y, $z^R$, t), where x=mΔx, y represents the y-spatial coordinate of the sensor, and t represents time. The index m is an integer used to identify the receiver and is also referred to as a "channel" index. For example, in FIG. 6A, the streamer 604 has 14 dual sensors. Dual sensor 616 located closest to the vessel 602 can be assigned a channel index m=0, and dual sensor 618 located farthest from the vessel 602 can be assigned a channel index m=13, with the remaining dual sensors in between numbered consecutively.

The subscript vector $\vec{n}$ represents a normal unit vector that points in the direction normal to the acquisition surface. The motion sensors detect particle motion in a direction normal to the acquisition surface as represented by unit normal vector 620 in magnified view 610. Thus, the motion sensors are sensing a velocity wavefield $v_{\vec{n}}$ normal to the smoothly varying acquisition surface.

In the following description of an example for correcting streamer-depth bias, a fluid-surface profile is to be calculated for each streamer. The y-spatial component is ignored in this example for clarity and in order to simplify the following description. However, note that in practice, the y-spatial component is included. In other words, in the discussion that follows, the three spatial coordinates of the measured pressure wavefield $p(x, y, z^R, t)$ are reduced to two spatial coordinates in pressure wavefield representation, $p(x, z^R, t)$, and the three spatial coordinates of the measured velocity wavefield $v_{\vec{n}}(x, y, z^R, t)$ are reduced to two spatial coordinates in velocity wavefield representation, $v_{\vec{n}}(x, z^R, t)$. The reduction to two spatial coordinates gives clear insight while preserving the main features of the method.

The pressure and motion sensors of each dual sensor measure pressure and velocity wavefields, but in order to calculate the fluid-surface profile, the pressure and velocity wavefields are decomposed into up-going and down-going pressure and velocity components. In FIG. 6A, directional arrow 622 represents the direction of an up-going wavefield detected by a dual sensor 626 and dashed line 624 represents the direction of a down-going wavefield reflected off of the fluid surface 606 and detected by the dual sensor 626. In other words, the pressure wavefield $p(x, z^R, t)$ is composed of an up-going pressure component and a down-going pressure component, and the velocity wavefield $v_{\vec{n}}(x, z^R, t)$ is composed of an up-going vertical velocity component and a down-going vertical velocity component. The fluid-surface profile associated with each streamer can be determined from the up-going and down-going pressure components or from the up-going and down-going velocity components.

Figure 6B:
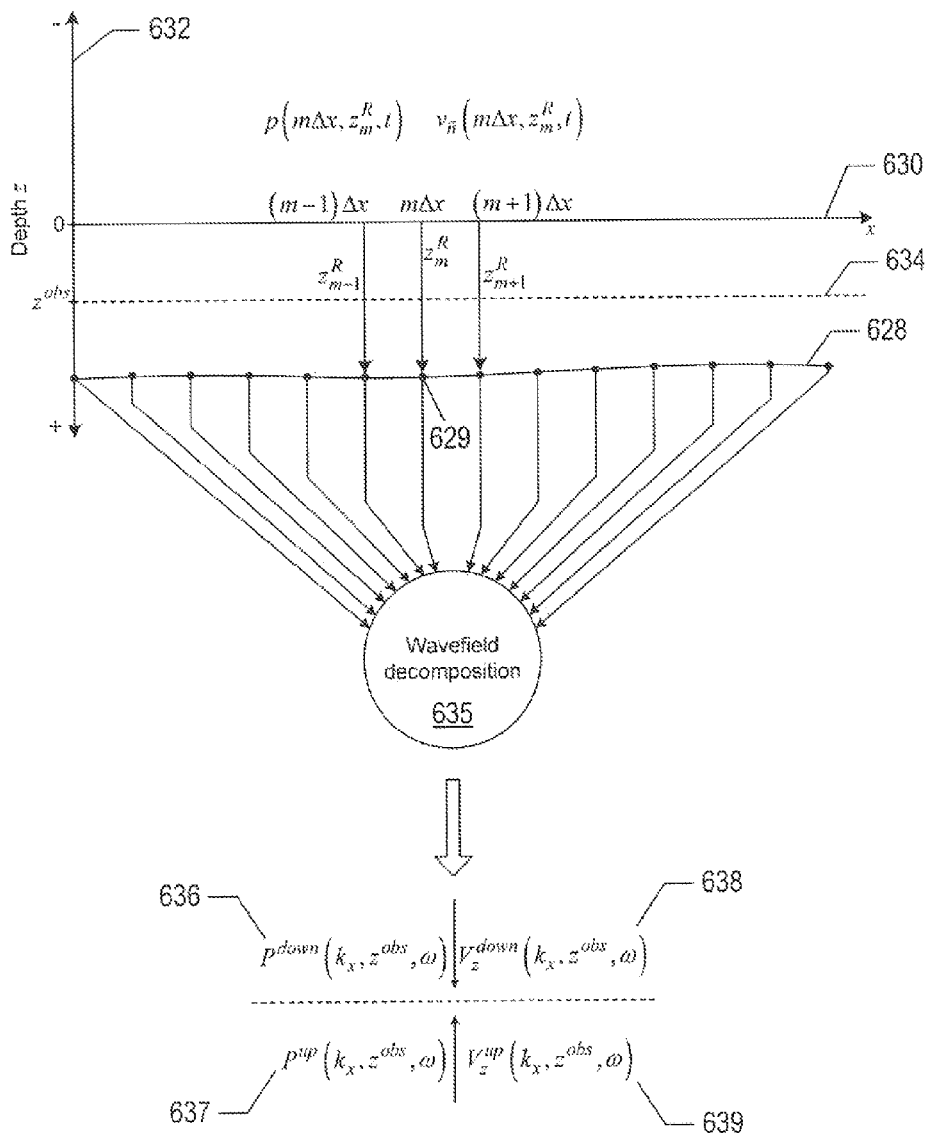

Wavefield decomposition can be performed by arbitrarily selecting an observation level at a constant depth $z^{obs}$ between the acquisition surface and the geoid shown in FIG. 6A. FIG. 6B shows an example plot of an interpolated streamer 628 based on the estimated depths obtained from depth controllers attached to the actual streamer 604. The shape of the interpolated streamer substantially matches the shape of the actual streamer 604 shown in FIG. 6A. Shaded disks, such as shaded disk 629, represent the locations of dual sensors located along the interpolated streamer 628. Horizontal axis 630 is an x-coordinate axis that represents the x-spatial dimension, and vertical axis 632 is a z-coordinate axis that represents the depth or z-spatial dimension. The "0" z-spatial coordinate corresponds to the geoid. Dashed-line 634 represents an example of a selected observation level at a constant depth of $z^{obs}$ located between the geoid and the estimated depth of the interpolated streamer 628. As shown in FIG. 6B, wavefield decomposition 630 combines the pressure wavefield $p(m(x, z_m^R, t)$ and velocity wavefield $v_{\vec{n}}(m\Delta x, z_m^R, t)$ measured at the dual sensors in the space-time domain, where $z_m^R$ is the interpolated depth at the $m^{th}$ channel, to produce a down-going pressure component $P^{down}(k_x, z^{obs}, \omega)$ 636, an up-going pressure component $P^{up}(k_x, z^{obs}, \omega)$ 637, a down-going velocity component $V_z^{down}(k_x, z^{obs}, \omega)$ 638 and an up-going velocity component $V_z^{up}(k_x, z^{obs}, \omega)$ 639 in the wavenumber-frequency domain, where $\omega=2\pi f$ is the angular frequency for the acoustic frequencies f detected by the dual sensors, and $k_x$ is the horizontal wavenumber in the x-direction.

Wavefield decomposition can be accomplished as follows. First, the pressure wavefield $p(x, z^R, t)$ and the velocity wavefield $v_{\vec{n}}(x, z^R, t)$ are transformed from the space-time domain using a Fourier transform to obtain the pressure wavefield $P(x, z^R, \omega)$ and the velocity wavefield $V_{\vec{n}}(x, z^R, \omega)$ in the space-frequency domain. The transformation can be carried out by a Fast-Fourier Transform ("FFT") for computational efficiency. Note that in accordance with convention, lower-case letters p and v are used to represent quantities in the space-time domain while upper-case letters P and V are used to represent quantities in the space-frequency or wavenumber-frequency domain.

Next, after the pressure and velocity wavefields have been transformed from the space-time domain to the space-frequency domain, the arbitrary flat observation level at constant depth $z^{obs}$ is selected as shown in FIG. 6B. Note the fluid surface 606 shown in FIG. 6A is a surface of undetermined shape and does not necessarily have to be a horizontal plane defined by the geoid as z=0. The up-going pressure component in the wavenumber-frequency domain is calculated by applying the following equation:

$$P^{up}(k_x, z=0, \omega) = \frac{\Delta x}{-zjk_z} \sum_{m=0}^{M-1} \{j\omega\rho V_{\vec{n}}(m\Delta x, z_m^R, \omega) e^{(jk_x m\Delta x - jk_z z_m^R)} + P(m\Delta x, z_m^R, \omega) e^{(jk_x m\Delta x - jk_z z_m^R)}(jk_x n_x - jk_z)$$

where j is the imaginary unit $\sqrt{-1}$;

$k_z$ is the vertical wavenumber in the z-direction given by $$k_z = \sqrt{\left(\frac{\omega}{c}\right)^2 - k_x^2}$$

with c the speed of sound in the fluid;

m is the dual sensor or channel index;

M is the total number of dual sensors located along the streamer;

$\rho$ is the density of the fluid;

$z_m^R$ is the interpolated depth of the streamer at the $m^{th}$ dual sensor;

$n_x$ is the x-component of the normal vector $\vec{n}$; and $n_z$ is the z-component of the normal vector $\vec{n}$.

The up-going pressure component at the observation level $z^{obs}$ 628 is calculated from the $P^{up}(k_x, z=0, \omega)$ by:

$$P^{up}(k_x, z^{obs}, \omega) = P^{up}(k_x, z=0, \omega) e^{jk_z z^{obs}}$$

The down-going pressure component in the wavenumber-frequency domain at z=0 is calculated by applying the following equation:

$$P^{down}(k_x, z=0, \omega) = \frac{\Delta x}{zjk_z} \sum_{m=0}^{M-1} \{j\omega\rho V_{\vec{n}}(m\Delta x, z_m^R, \omega) e^{(jk_x m\Delta z + jk_z z_m^R)} + P(m\Delta x, z_m^R, \omega) e^{(jk_x m\Delta x + jk_z z_m^R)}(lk_x n_r + jk_z)$$

From the down-going pressure component $P^{down}(k_x, z=0, \omega)$ the down-going pressure component, at the observation level $z^{obs}$ 628 is calculated by:

$$P^{down}(k_x,z^{obs},\omega)=P^{down}(k_x,z=0,\omega)e^{jk_z z^{obs}}$$

As described in greater detail below, the up-going and down-going pressure components alone can be used to calculate the fluid-surface profile. In other embodiments, the fluid-surface profile can be calculated using the up-going and down-going vertical velocity components, which can be determined from the up-going and down-going pressure components as follows. The up-going, vertical velocity component at the observation level $z^{obs}$ 628 is calculated from the up-going pressure component $P^{up}(k_x, z^{obs}, \omega)$, at the arbitrary observation level $z^{obs}$ 628 by:

$$V_z^{up}(k_x, z^{obs}, \omega) = -\frac{k_z}{\rho\omega} P^{up}(k_x, z^{obs}, \omega).$$

The down-going vertical velocity component at the observation level $z^{obs}$ 628 is calculated from the down-going pressure component $P^{down}(k_x, z^{obs}, \omega)$ at the arbitrary observation level $z^{obs}$ 628 as follows:

$$V_z^{up}(k_x, z^{obs}, \omega) = \frac{k_z}{\rho\omega} P^{up}(k_x, z^{obs}, \omega)$$

Note that a three-spatial-dimensional version of the up-going and down-going pressure components and the up-going and down-going vertical velocity components can be obtained by replacing the vertical wavenumber $k_z$ by:

$$k_z = \sqrt{\left(\frac{\omega}{c}\right)^2 - k_y^2 - k_x^2}$$

where $k_y$ is the horizontal wavenumber in the y-spatial direction.

Figure 6C:
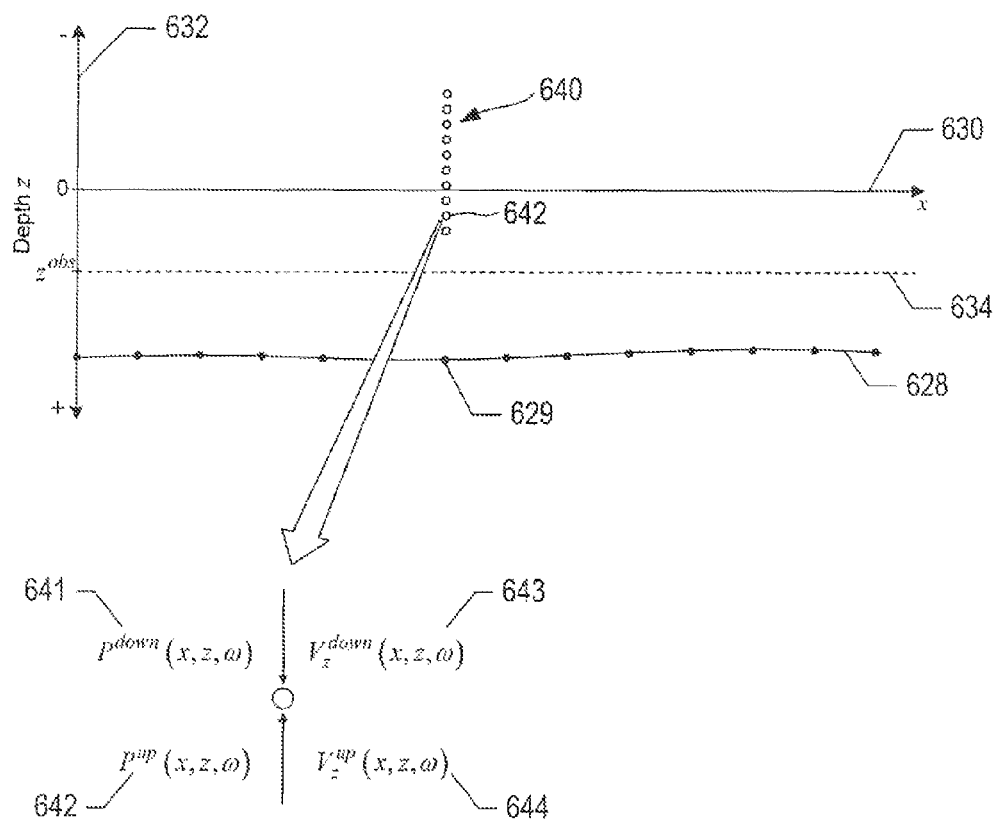

After wavefield decomposition has been accomplished, the up-going and down-going pressure components and/or the up-going and down-going vertical velocity components are iteratively extrapolated in small steps in the z-spatial direction from the observation level upwards through the fluid toward the fluid surface 606. Extrapolation can be accomplished as follows. FIG. 6C shows an example representation of extrapolating from the arbitrary observation level $z^{obs}$ 634 toward the geoid for the $m^{th}$ channel 629. Open circles 640 represent a series of z values or small steps in the z-spatial direction that extend from the observation level 634 toward the geoid or x-axis 630. The up-going pressure component is extrapolated by applying the following equation:

$$P^{up}(k_x,z,\omega)=P^{up}(k_x,z^{obs},\omega)e^{-jk_z(z^{obs}-z)}$$

to each point z in the series of z-values 640. The down-going pressure component is extrapolated by applying the following equation:

$$P^{down}(k_x,z,\omega)=P^{down}(k_x,z^{obs},\omega)e^{jk_z(z^{obs}-z)}$$

to each point z in the series of z-values 640.

In another embodiment, the up-going vertical velocity component is extrapolated from the observation level $z^{obs}$ toward the geoid by applying the following equation:

$$V_z^{up}(k_x,z,\omega)=V_z^{up}(k_x,z^{obs},\omega)e^{-jk_z(z^{obs}-z)}$$

to each point z in the series of z-values 640. The down-going vertical velocity component is extrapolated by applying the following equation:

$$V_z^{down}(k_x,z,\omega)=V_z^{down}(k_x,z^{obs},\omega)e^{-jk_z(z^{obs}-z)}$$

to each point z in the series of z-values 640.

After the extrapolated up-going and down-going pressure components and/or extrapolated up-going and down-going vertical velocity components have been determined in the wavenumber-frequency domain, an inverse Fourier transform is used to obtain extrapolated up-going and down-going pressure components and/or extrapolated up-going and down-going vertical velocity components in the space-frequency domain. The transformation can be an Inverse Fast-Fourier Transform ("IFFT") for computational efficiency. For example, in FIG. 6C, extrapolation is performed at the point 642 of the series of z-values 640 to produce a down-going pressure component $P^{down}(x, z, \omega)$ 641, an up-going pressure component $P^{up}(x, z, \omega)$ 642, a down-going vertical velocity component $V_z^{down}(x, z, \omega)$ 643 and an up-going vertical velocity component $V_z^{up}(x, z, \omega)$ 644 in the space-frequency domain.

After each extrapolation of the up-going and down-going pressure component or vertical velocity component to a point z in the series of z-values 640 has been accomplished, an imaging condition is applied to obtain a series of corresponding image values I(x, z) associated with each z-value in the series 640. The imaging condition is a cross correlation of the extrapolated up-going and down-going pressure or vertical velocity components in the space-frequency domain. In one embodiment, the imaging condition that represents a fluid-surface image value for a selected channel position x and extrapolation depth z is calculated by applying the following cross-correlation equation:

$$I(x, z) = \sum_\omega D(x, z, \omega)\overline{U(x, z, \omega)}$$

where the overbar designates complex conjugation. Note that in one embodiment, $D(x, z, \omega)$ and $U(x, z, \omega)$ represent $P^{down}(x, z, \omega)$ and $P^{up}(x, z, \omega)$, respectively. In another embodiment, $D(x, z, \omega)$ and $U(x, z, \omega)$ represent $V_z^{down}(x, z, \omega)$ and $V_z^{up}(x, z, \omega)$, respectively. In other embodiments, the imaging condition used to represent a fluid-surface image value for a selected channel position x and extrapolation depth z is calculated by applying the following normalized cross-correlation equation:

$$I(x, z) = \frac{\sum_\omega U(x, z, \omega)\overline{D(x, z, \omega)}}{\sum_\omega U(x, z, \omega)\overline{U(x, z, \omega)}}$$

Figure 6D:
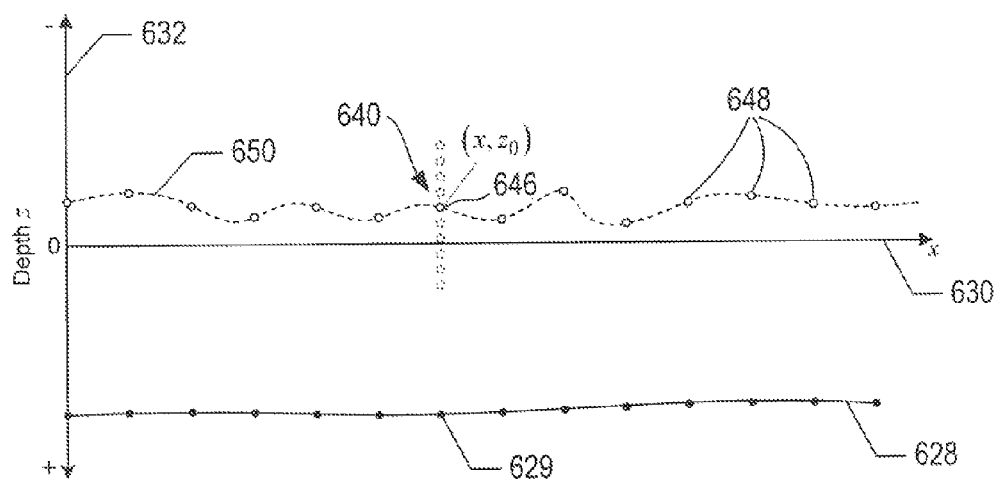

The z-value or extrapolation depth associated with the maximum image value I(x, z) for a given channel position x corresponds to the fluid-surface elevation z at the channel position x. FIG. 6D shows an example plot of a fluid-surface profile obtained from determining the extrapolation depth z associated with each channel position x of the interpolated streamer 628. In the example of FIG. 6D, the z-values 640 associated with the channel 629 are represented as dashed-line open circles except for the circle 646 which corresponds to an elevation $z_0$ that yields a maximum cross-correlation $I_{max(x,z_0)}$. The point $(x, z_0)$ is an image point of the fluid-surface profile. Other image points represented by open circles, such as open circles 648; are obtained for each channel in the same manner by extrapolating and applying the same imaging condition to each of the channels. This collection of image points forms a time stationary image of the fluid-surface profile along the streamer in a selected time window. In FIG. 6D, dashed curve 650 represents a fluid-surface profile for the set of image points obtained by applying an imaging condition to each channel of the interpolated streamer 628 at the selected time window.

After the fluid-surface profile is determined, spectral analysis is performed on the image points comprising the fluid-surface profile in order to determine whether or not the streamer depth is biased. Fluid-surface profiles obtained without taking into account an accurate estimate of the streamer depth result in an inaccurate estimation of the fluid-surface elevation, which, in turn, can result in inaccurate images of the subterranean formation located beneath the fluid volume. For example, the image points, $z(x)$, where x is a channel coordinate of a periodic fluid-surface profile, are a smoothly varying set of points that can be modeled by a Fourier series as follows:

$$z(x) = \sum_k a_k \exp\left(i2\pi \cdot \frac{k}{L_x} \cdot x\right)$$

where the coefficients are determined by:

$$a_k = \frac{1}{L_x} \int_{-L_x/2}^{L_x/2} z(x)\exp\left(-i2\pi \cdot \frac{k}{L_x} \cdot x\right)$$

with $k = \ldots, -, 0, 1, \ldots$ and $L_x$ is the fundamental wavelength. The coefficients $\ldots, a_{-1}, a_0, a_1, \ldots$ are the amplitudes of cosine and sine wave components with the coefficient $a_0$ referred to as the "DC offset." A non-zero value for the DC offset indicates that the fluid-surface profile is vertically displaced, which as demonstrated above, results from a bias in the estimated elevation of the streamer. The image points can be spectrally analyzed to determine whether or not streamer-depth bias is present, and when streamer-depth bias is present, correct the elevation estimate of the streamer depth in order to obtain a more accurate elevation for the fluid-surface profile and fluid-surface profiles at different time windows. In one embodiment, spectral analysis can be accomplished by applying a discrete Fourier transform to transform the image points comprising a fluid-surface profile from the spatial domain x to a spectrum in the horizontal-wavenumber domain, k. The transformation can be a discrete FFT for computational efficiency. An examination of the spectrum at $k=0$ reveals whether or not streamer-depth bias is present, because the DC offset appears in the spectrum as a non-zero value at $k=0$.

Figure 7:
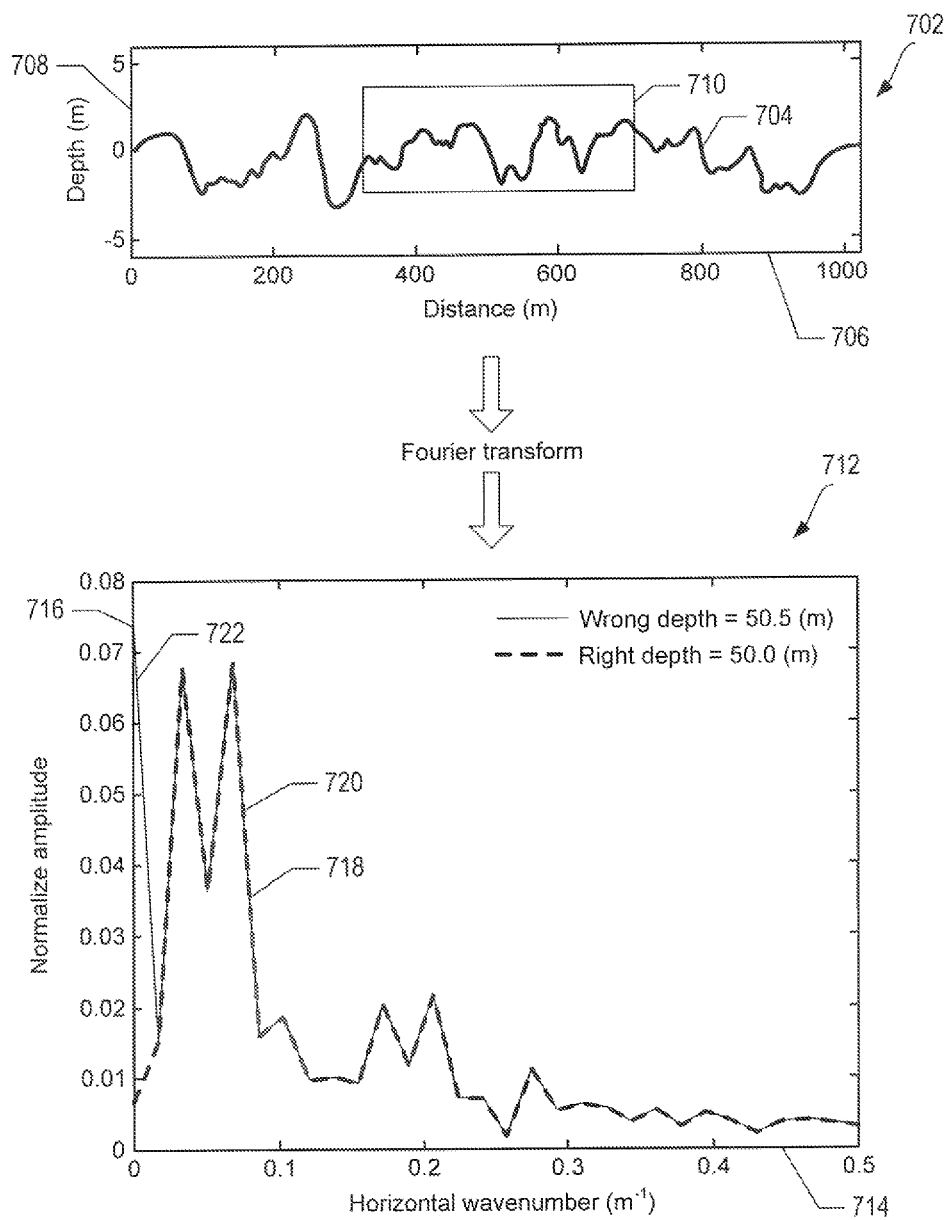
FIG. 7 shows an example of spectral analysis performed on an example of a fluid-surface profile.

An example of spectral analysis is now described with reference to synthetic data represented in FIG. 7. FIG. 7 shows a plot 702 of a fluid-surface profile 704 generated from a Pierson-Moskowitz spatial roughness spectrum for a fully developed fluid surface. Horizontal axis 706 represents the horizontal distance in the x-direction and vertical axis 708 represents depth with "0" corresponding to the geoid. The portion of the fluid-surface profile in box 710 is transformed using a Fourier transform to obtain a spectral plot 712. Horizontal axis 714 represents a horizontal wavenumber k and vertical axis 716 represents normalized amplitude. Solid curve 718 and dashed curve 720 represents spectra of normalized amplitudes associated with the horizontal wavenumbers. Note that dashed curve 720 overlaps most of the curve 718. The spectra represented by curves 718 and 720 can be computed by applying a discrete Fourier transform to M image points $z(x)$ of the spectrum shown in box 710. For example, a discrete Fourier transform is given by:

$$\begin{aligned} Z(k) &= \sum_{m=0}^{M-1} z(m)\exp\left(-i2\pi \cdot \frac{m}{M} \cdot k\right) \\ &= \sum_{m=0}^{M-1} z(m)\cos\left(2\pi \cdot \frac{m}{M} \cdot k\right) - i\sum_{m=0}^{M-1} z(m)\sin\left(2\pi \cdot \frac{m}{M} \cdot k\right) \\ &= \text{Re}[Z(k)] - i\text{Im}[Z(k)] \end{aligned}$$

where $m=0, \ldots, M-1$, and the normalized amplitude is computed as follows:

$$\text{Norm Amp} = \frac{\sqrt{\text{Re}[Z(k)]^2 - i\text{Im}[Z(k)]^2}}{\text{Amp}_{max(k)}}$$

In practice, for computational efficiency, the amplitude can actually be calculated using a discrete fast Fourier transform. The solid curve 718 represents the spectrum of the fluid-surface profile shown in box 710 where the depth of the sensors where wrongly determined to be 50.5 meters during imaging. The spike 722 at $k=0$ indicates a non-zero DC offset or that the fluid-surface profile in box 710 is vertically displaced in the z-spatial direction. On the other hand, dashed curve 720 represents the spectrum of the fluid-surface profile where a more accurate depth of the sensors at 50 meters have been taken into account during fluid-surface imaging. In other embodiments, rather than computing the spectra associated with the normalized amplitude, the spectra can be computed using the un-normalized amplitude $\sqrt{\text{Re}[Z(k)]^2+\text{Im}[Z(k)]^2}$, the real component Re[Z (k)], or the imaginary component Im[Z(k)].

Figure 8A:
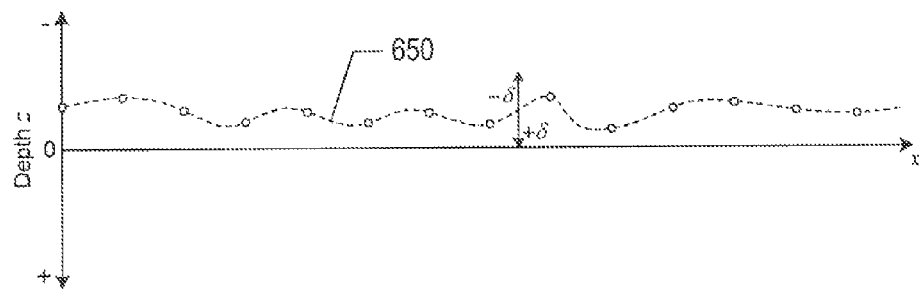
FIGS. 8A-8B show an example of correcting streamer-depth bias in fluid-surface profile and streamer.
Figure 8B:
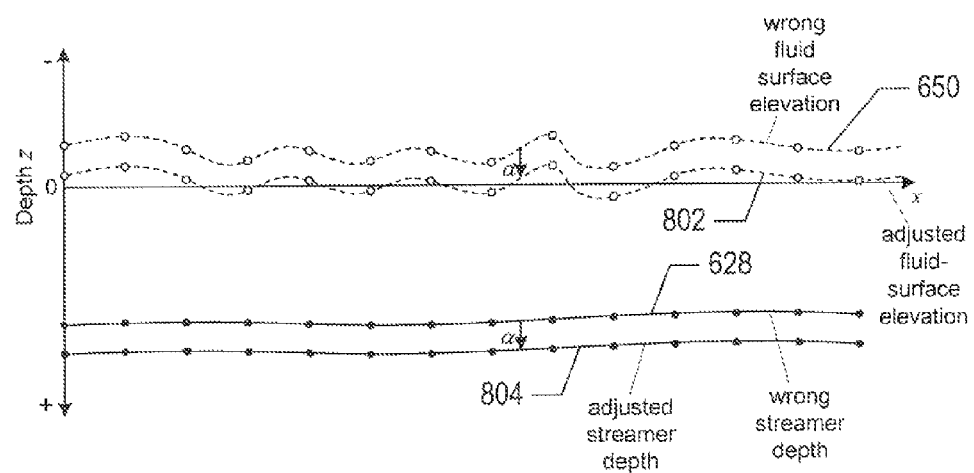

The DC offset can be minimized by incrementally shifting the z-coordinates of the image points of fluid-surface profile by a shift factor $\pm\delta$ followed by performing spectral analysis to determine whether a $+\delta$ shift or a $-\delta$ shift reduces the DC offset. The shift factor that reduces the DC offset is then applied incrementally until a minimum DC offset, $DC_{min}$, is obtained. The magnitude of the shift factor can range in size from tenths of a meter to several meters. FIG. 8A shows an example plot of the shift factor's $\pm\delta$ applied to the set of biased image points of the fluid-surface profile 650. The bias in the vertical displacement of the fluid-surface profile 650 is represented by the image points lying above the geoid, which is represented by the x-axis. The image points are shifted by adding the shift factor to the z-coordinates of the image points. As shown in FIG. 8A, the $+\delta$ shift factor shifts the image points in the positive z-direction, while the $-\delta$ shift factor shifts the image points in the negative z-direction. After each incremental shift by the appropriate shift factor, spectral analysis is performed on the image points to determine whether or not the shift resulted in a smaller DC offset. If the DC offset is smaller, then the image points are incrementally shifted by the same shift factor until a $DC_{min}$ is obtained. FIG. 8B shows an example plot of an adjusted fluid-surface profile 802 and an adjusted interpolated streamer 804. In FIG. 8B, the z-coordinates of the image points of the adjusted fluid-surface profile 802 and z-coordinates of the channels of the interpolated streamer 804 have been shifted by the same elevation parameter $\alpha$. A Fourier transform of the image points of the adjusted fluid-surface profile 802 gives a spectrum in which the DC offset 806 is minimized, such as the example spectrum represented by dashed curve 720 shown in FIG. 7.

Figure 9:
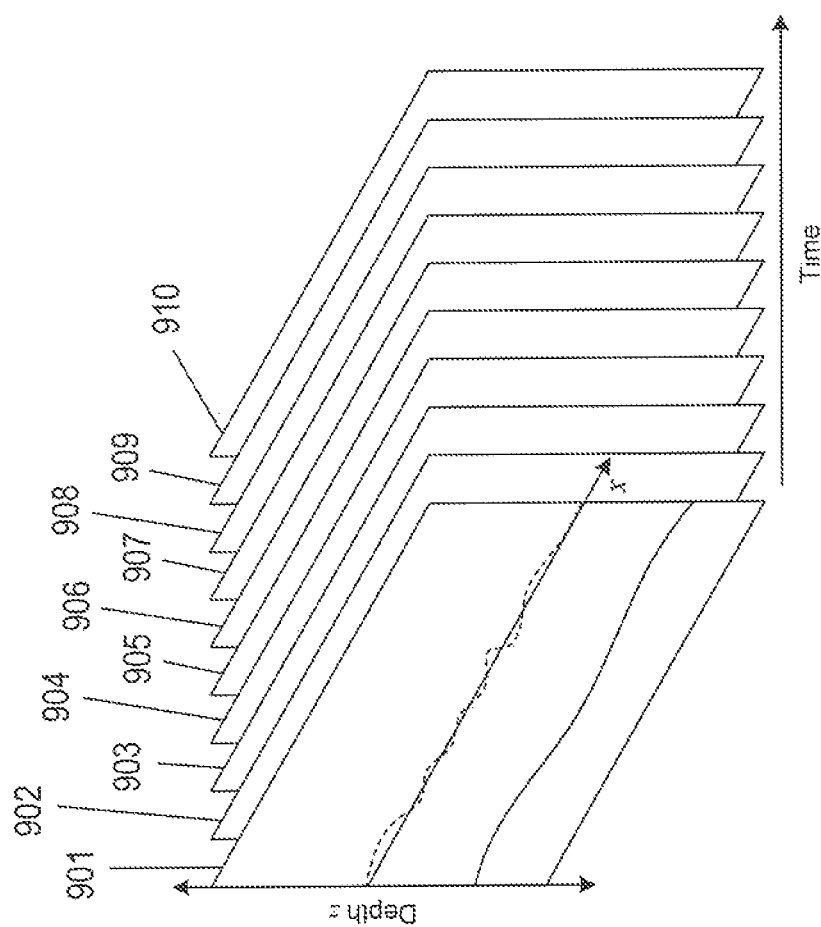
FIG. 9 shows a conceptual representation of calculating fluid-surface profiles at different time windows of a sliding time window.

The elevation parameter α can then be applied to adjust the streamer depth used to recalculate the wavefield separation and calculate the fluid-surface profile. The spectral analysis repeated and if needed a second iteration of sea-surface updating is started. When the DC component is sufficiently small the sea surface imaging is applied in each time window of a sliding time window. In other words, after the elevation α has been determined for the initial time window, the same elevation α can be used to adjust the streamer-depth bias for each time window of a sliding time window. Different fluid-surface profiles can be obtained as described above with reference to FIGS. 6A-6D for each time window of the sliding time window but with the interpolated streamer depth shifted to account for the streamer-depth bias. FIG. 9 shows a conceptual representation of calculating fluid-surface profiles at different time windows 901-910 of a sliding time window. At time window 901 t=0, the fluid-surface profile 650 is calculated from the interpolated streamer 628 as described above with reference to FIGS. 6A-6D, and spectral analysis is used to determine the elevation α used to correct the estimated streamer depth and fluid-surface-profile elevation, as described above with reference to FIGS. 7 and 8. Fluid-surface profiles associated with the subsequent time windows 902-910 can be calculated in the same manner as described above with reference to FIGS. 6A-6D, but with the streamer depth for each of the time windows 902-910 corrected by the elevation α.

Figure 10A:
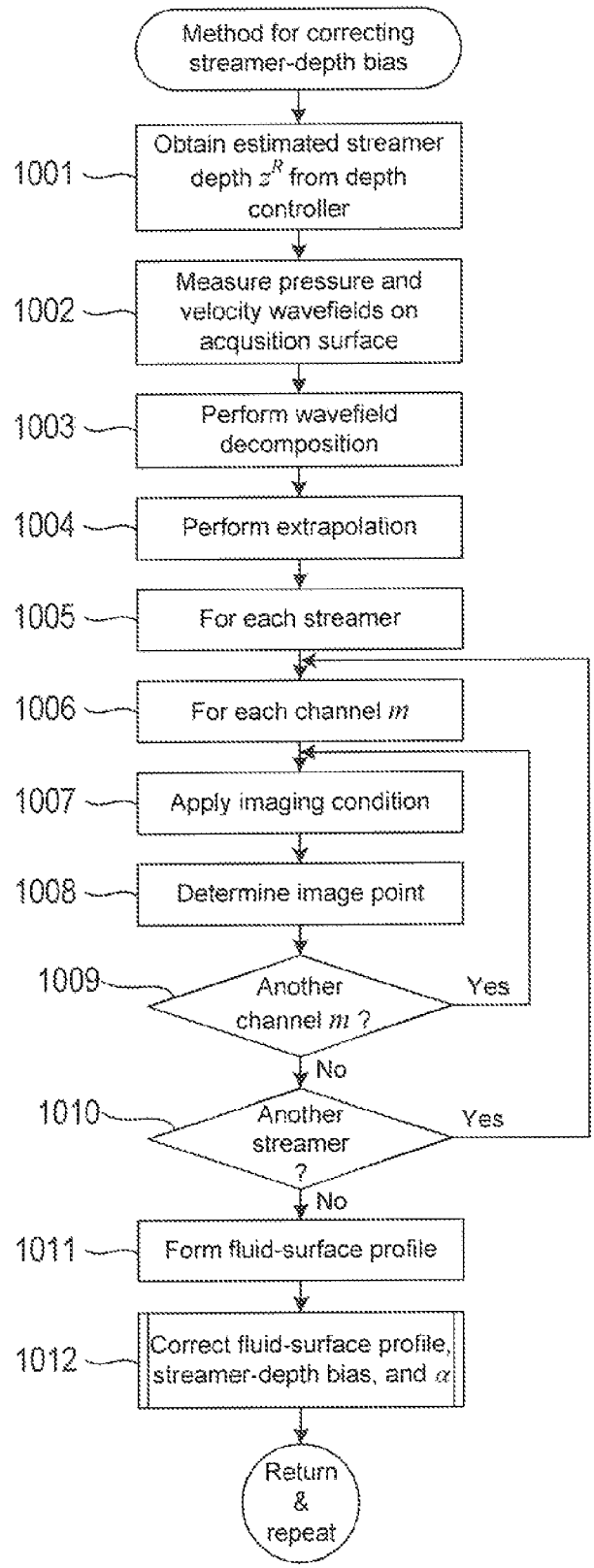
FIG. 10A shows a control-flow diagram of a method for correcting streamer-depth bias.

FIG. 10A shows a control-flow diagram of a method for correcting streamer-depth bias. In block 1001, streamer depths are estimated based on hydrostatic pressure measurements obtain from depth controllers distributed along the streamers, as described above with reference to FIGS. 5B and 6A. In block 1002, pressure and velocity wavefields are measured at the dual sensors as described above with reference to FIG. 6A. In block 1003, wavefield decomposition is perform on the pressure and velocity wavefields to obtain up-going and down-going pressure components or up-going and down-going vertical velocity components, as described above with reference to FIG. 6B. In block 1004, the pressure and/or vertical velocity components associated with each channel are extrapolated from an arbitrary observation level through a series of steps in the vertical or z-direction, as described above with reference to FIG. 6C. In the for-loop beginning in block 1005, the processes associated with blocks 1006-1009 are executed for each streamer. In the for-loop beginning in block 1006, the processes associated with blocks 1007-1009 are executed for each channel. In block 1007, an imaging condition is applied as described above with reference to FIG. 6D. In block 1008, the z-value associated with the maximum imaging condition for a given channel is determined, as described above with reference to FIG. 6D. In block 1009, when another channel is available, the method proceeds to block 1007 and the processes associated with blocks 1007-1008 are repeated, otherwise, the method proceeds to block 1010. In block 1010, when another streamer is available, the processes associated with blocks 1006-1009 are repeated, otherwise, the method proceeds to block 1011. In block 1011, the image points associated with each channel and streamer are collected to form fluid-surface profiles. In block 1012, a method described below with reference FIG. 10B is called to correct the elevation of the fluid-surface profiles, the streamer-depth bias and return an elevation value α that can be used to correct the streamer-depth bias in subsequently determined fluid-surface profiles.

Figure 10B:
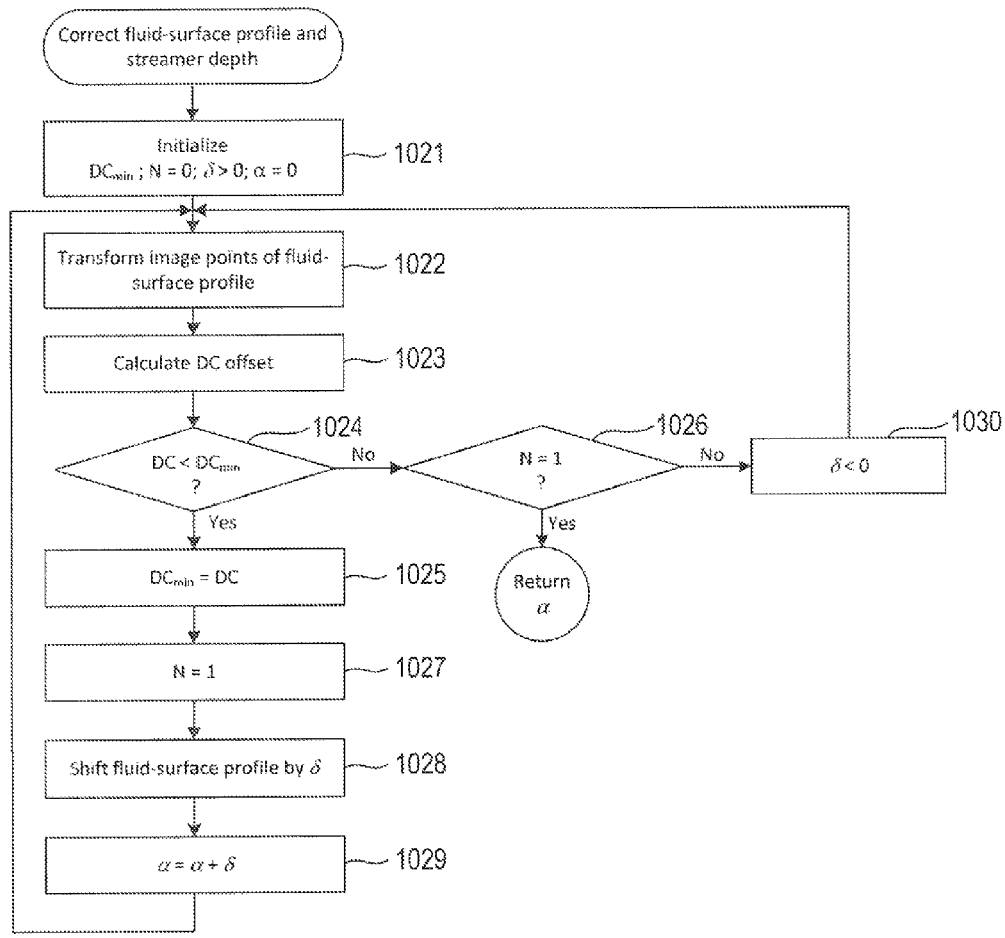
FIG. 10B shows a control-flow diagram of a method to correct a fluid-surface profile and streamer depth called in step 1012 of FIG. 10A.

FIG. 10B shows a control-flow diagram of a method to correct a fluid-surface profile and streamer-depth bias called in step 1012 of FIG. 10A. In block 1021, a minimum DC offset parameter, $DC_{min}$, is initialized to a large value, a parameter N is initialized to "0," the vertical shift factor δ is initialized to a value greater than zero, such as one meter, and the elevation α is initialized to "0." In block 1022, image points of a fluid-surface profile calculated as described above with reference to FIG. 10A are transformed to obtain a spectrum in the horizontal-wavenumber domain. The transform can be a Fourier transform, such as an FFT, described above with reference to FIG. 7. In block 1023, the spectrum is analyzed to determine a DC offset, denoted by DC, as described above with reference to FIG. 7. For example, DC can be assigned the value of the amplitude, normalized amplitude, the real component of the Fourier transform, or the imaginary component of the Fourier transform, as described above with reference to FIG. 7. In block 1024, when DC is less than $DC_{min}$, the method proceeds to block 1025, otherwise the method proceeds to block 1026. In block 1025, $DC_{min}$ is assigned the value of DC. In block 1027, N is assigned the value "1." In block 1028, z-components of the image points of the fluid-surface profile are shifted by the parameter δ, as described above with reference to FIGS. 8A-8B. In block 1029, the elevation α is increment by δ. In block 1026, when the parameter N is equal to "1," the method returns the elevation α. Otherwise, the method proceeds to block 1030 to change the shift factor to a negative value and the processes executed in blocks 1022-1029 are repeated.

Figure 11:
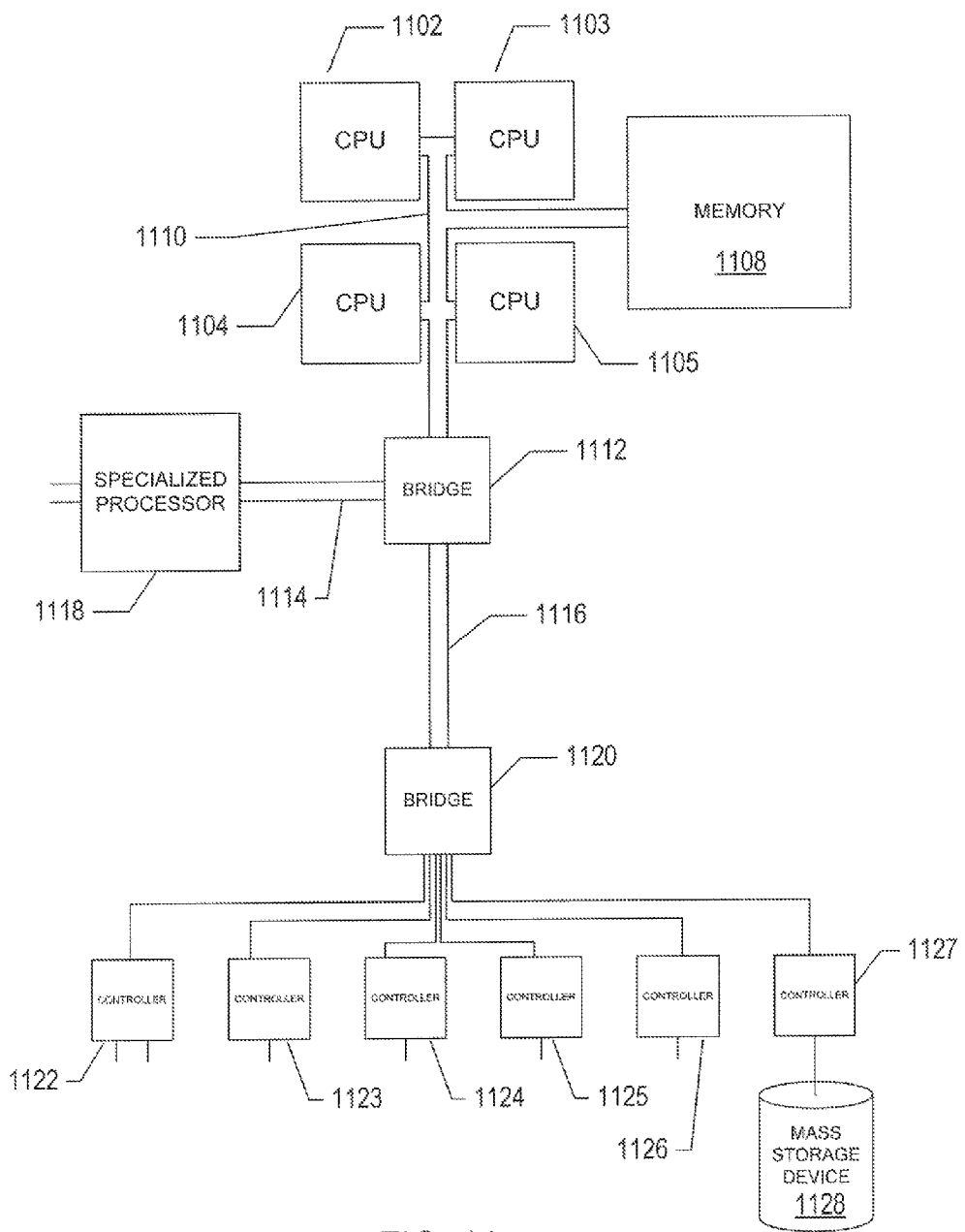
FIG. 11 shows one example of a generalized computer system.

FIG. 11 shows one example of a generalized computer system that executes an efficient streamer-depth bias correction and therefore represents a seismic-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 1102-1105, one or more electronic memories 1108 interconnected with the CPUs by a CPU/memory-subsystem bus 1110 or multiple busses, a first bridge 1112 that interconnects the CPU/memory-subsystem bus 1110 with additional busses 1114 and 1116, or other types of high-speed interconnection, media, including multiple, high-speed serial interconnects. These busses or serial interconnections, in turn, connect the CPUs and memory with specialized processors, such as a graphics processor 1118, and with one or more additional bridges 1120, which are interconnected with high-speed serial links or with multiple controllers 1122-1127, such as controller 1127, that provide access to various different types of mass-storage devices 1128, electronic displays, input devices, and other such components, subcomponents, and computational resources. The electronic displays, including visual display screen, audio speakers, and other output interfaces, and the input devices, including mice, keyboards, touchscreens, and other such input interfaces, together constitute input and output interfaces that allow the computer system to interact with human users. Computer-readable data-storage devices include various types of electronic memories, optical and magnetic disk drives, USB drives, and other such devices. Computer-readable data-storage media include Optical disks, magnetic disks, and other media in which computer instructions and data can be encoded, during store operations, and from which encoded data can be retrieved, during read operations, by computer systems, data-storage systems, and peripheral devices.

Although various embodiments have been described, it is not intended that this disclosure be limited to these embodiments. For example, any number of different computational-processing-method implementations that carry out streamer-depth bias correction based on pressure and velocity wavefields may be designed and developed using various different programming languages and computer platforms and by varying different implementation parameters, including control structures, variables, data structures, modular organization, and other such parameters. The computational representations of wavefields and other computational objects may be implemented in different ways. Although streamer-depth correction discussed above can be carried out on a single one-dimensional streamer, streamer-depth correction can be carried out on the entire acquisition surface.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An exploration-seismology computer system that corrects for streamer-depth bias in a fluid-surface profile, the exploration-seismology computer system comprising:
    one or more processors;
    one or more data-storage devices; and
    a routine stored in one or more of the one or more data-storage devices and to be executed by the one or more processors, the routine directed to
        determining a set of image points associated with the fluid-surface profile of a fluid located above a streamer based on pressure and velocity wavefields measured at dual sensors of the streamer, and
        determining an elevation parameter of the image points that reduces a DC offset in a spectral domain of the image points, the elevation parameter to correspond to the streamer-depth bias.

2. The computer system of claim 1, further comprising the routine stored in the one or more of the one or more data-storage devices further directed to:
    receiving seismic data from the dual sensors, the seismic data representative of pressure wavefields and velocity wavefields;
    measuring hydrostatic pressures at depth controllers spaced along the streamer;
    estimating a streamer depth at one or more depth controllers, based on the hydrostatic pressures; and
    generating an interpolated streamer that approximates the wave-like configuration of the streamer based on the estimated streamer depths.

3. The computer system of claim 1, wherein determining a set of image points associated with the fluid-surface profile further comprises:
    decomposing the wavefield into an up-going component and a down-going component at an arbitrary observation level located between an estimated streamer depth and a geoid;
    for each dual sensor of the streamer,
        extrapolating the up-going and down-going components from the observation level toward the geoid by computing a series of extrapolation points that extend from the arbitrary observation level toward the geoid;
        applying an imaging condition to each extrapolation point; and
        determining an image point that corresponds to a maximum image value of the imaging condition.

4. The computer system of claim 3, wherein decomposing the wavefield into an up-going component and a down-going component further comprises decomposing the pressure wavefield in a space-time domain into an up-going pressure component and a down-going pressure component in a wavenumber-frequency domain.

5. The computer system of claim 3, wherein decomposing the wavefield into an up-going component and a down-going component further comprises decomposing the velocity wavefield in a space-time domain into an up-going vertical velocity component and a down-going vertical velocity component in a wavenumber-frequency domain.

6. The computer system of claim 3, wherein extrapolating the up-going and down-going components further comprises iteratively extrapolating the up-going and down-doing components from the arbitrary observation level upwards through the fluid toward the geoid at each dual sensor location.

7. The computer system of claim 3, wherein the imaging condition further comprises a cross correlation of the up-going component and the down-going component in a space-frequency domain.

8. The computer system of claim 1, wherein determining the elevation parameter of the image points that reduces a DC offset in the spectral domain further comprises:
    applying a shift factor that vertically displaces the image points in a spatial domain;
    transforming the image points from the spatial domain to a spectral domain to obtain a spectrum in the spectral domain;
    identifying the DC offset in the spectrum; and
    repeatedly applying the shift factor, transforming the image points and identifying the DC offset until a minimum DC offset is obtained, wherein the total amount by which the image points are vertically displaced is the elevation parameter.

9. The computer system of claim 8, wherein transforming the image points from the spatial domain to a spectral domain further comprises applying a discrete Fast Fourier-transform computational operator to each of the image points in the spatial domain to obtain a point in the spectral domain.

10. The computer system of claim 8, wherein the spectral domain further comprises a horizontal-wavenumber domain.

11. A method to be carried out by a computer system that includes one or more processors and one or more data-storage devices to correct streamer-depth bias in a fluid-surface profile, the method comprising:
    determining a set of image points associated with the fluid-surface profile of a fluid located above a streamer based on pressure and velocity wavefields measured at dual sensors of the streamer;
    determining an elevation parameter of the image points that reduces a DC offset in a spectral domain of the image points, the elevation parameter to correspond to the streamer-depth bias; and
    storing the elevation parameter in a data storage device.

12. The method of claim 11, further comprising:
    receiving seismic data from the dual sensors, the seismic data representative of pressure wavefields and velocity wavefields;
    measuring hydrostatic pressures at depth controllers spaced along the streamer;

estimating a streamer depth at one or more depth controllers, based on the hydrostatic pressures; and generating an interpolated streamer that approximates the wave-like configuration of the streamer based on the estimated streamer depths.

13. The method of claim 11, wherein determining a set of image points associated with the fluid-surface profile further comprises decomposing the wavefield into an up-going component and a down-going component at an arbitrary observation level located between an estimated streamer depth and a geoid;

for each dual sensor of the streamer, extrapolating the up-going and down-going components from the arbitrary observation level toward the geoid by computing a series of extrapolation points that extend from the arbitrary observation level toward the geoid;

applying an imaging condition to each extrapolation point; and determining an image point that corresponds to a maximum image value of the imaging condition.

14. The method of claim 13, wherein decomposing the wavefield into an up-going component and a down-going component further comprises decomposing the pressure wavefield in a space-time domain into an up-going pressure component and a down-going pressure component in a wavenumber-frequency domain.

15. The method of claim 13, wherein decomposing the wavefield into an up-going component and a down-going component further comprises decomposing the velocity wavefield in a space-time domain into an up-going vertical velocity component and a down-going vertical velocity component in a wavenumber-frequency domain.

16. The method of claim 13, wherein extrapolating the up-going and down-going components further comprises iteratively extrapolating the up-going and down-doing components from the arbitrary observation level upwards through the fluid toward the geoid at each dual sensor location.

17. The method of claim 13, wherein the imaging condition further comprises a cross correlation of the up-going component and the down-going component in the space-frequency domain.

18. The method of claim 11, wherein determining the elevation parameter of the image points that reduces a DC offset in the spectral domain further comprises:

applying a shift factor that vertically displaces the image points in a spatial domain;

transforming the image points from the spatial domain to a spectral domain to obtain a spectrum in the spectral domain;

identifying the DC offset in the spectrum; and repeatedly applying the shift factor, transforming the image points and identifying the DC offset until a minimum DC offset is obtained, wherein the total amount by which the image points are vertically displaced is the elevation parameter.

19. The method of claim 18, wherein transforming the image points from the spatial domain to a spectral domain further comprises applying a discrete Fourier-transform computational operator to each of the image points in the spatial domain to obtain a point in the spectral domain.

20. The method of claim 18, wherein the spectral domain further comprises a horizontal-wavenumber domain.

* * * * *